Oct. 21, 1924.

H. D. MORTON

WELDING ELECTRODE

Filed Jan. 22, 1924

INVENTOR
Harry D. Morton
BY
Gifford, Bull & Seull
ATTORNEYS

Patented Oct. 21, 1924.

1,512,786

UNITED STATES PATENT OFFICE.

HARRY D. MORTON, OF NEW YORK, N. Y.

WELDING ELECTRODE.

Application filed January 22, 1924. Serial No. 687,677.

*To all whom it may concern:*

Be it known that I, HARRY D. MORTON, a citizen of the United States, residing in the city of New York, in the county of New York and State of New York, have invented certain new and useful Improvements in Welding Electrodes, of which the following is a specification.

The following is a description of metallic arc welding electrodes embodying my invention in the form and manner at present preferred by me; but it will be understood that various modifications and changes may be made without departing from the spirit of my invention and without exceeding the scope of my claims.

Figure 1:
Figure 2:
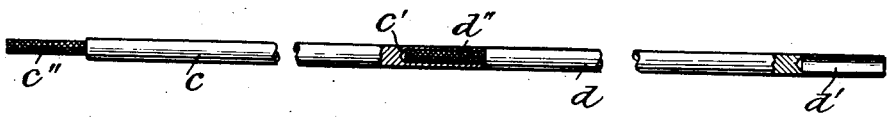
Figure 3:
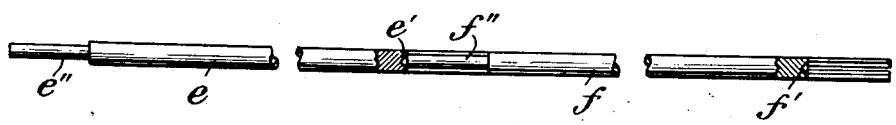
Figure 4:
Figure 5:
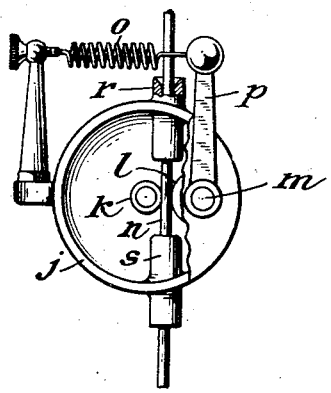

My invention will be best understood by reference to the accompanying drawings, in which I have illustrated the preferred forms for carrying out my invention and in which Fig. 1 is a side view, partially in section, of a welding electrode illustrating an electrode embodying one form of my invention; Figs. 2, 3 and 4 are views similar to Fig. 1, showing modifications of my invention; and Fig. 5 shows a device for feeding to the arc the several types of electrodes and for automatically applying pressure to couple the two or more separate sections shown in Fig. 2.

Referring to the drawings, Fig. 1 shows one form of my invention wherein the welding strip $a$ has formed in one end the slightly tapered recess $a'$ and has formed at its opposite end the slightly tapered pilot $a''$. When the welding strip $a$ has been partially fused, the operator inserts in the recess $a'$ the taperingly piloted end $b''$ of welding strip $b$, having formed in its opposite end the slightly tapered recess $b'$. The angle of the taper of the recesses and pilots respectively is very slight, so that a relatively small pressure, manually applied, will cause the two welding strips to adhere by friction, thus forming a practically continuous supply of welding material to be fed to the arc.

In Fig. 2 I show another form of my invention wherein the welding strip $c$ has formed in one end the recess $c'$, and at its opposite end the pilot $c''$. The recess $c'$ is adapted to receive the pilot $d''$ of the section $d$, having formed in its opposite end the recess $d'$. In this case, the sides of the recesses and the pilots respectively are not tapered but may be straight. The recesses are large relatively to the diameter of the welding strip sections, thus producing thin collapsible walls surrounding such recesses. The operator inserts the pilot $d''$ in the recess $c'$, and either manually forces the wall of the recess against the pilot, as by applying pressure with pliers of suitable form, or permits the feed rolls $k$ and $l$ of the device of Fig. 5 to automatically force the wall of the recess against the pilot. The pilots $c'$ and $d'$ may, if desired, be knurled or otherwise roughened to insure a more intimate contact between the successive welding strip sections.

In Fig. 3 I show another form of my invention wherein the welding strip section $e$ has formed in one end the recess $e'$, and at its opposite end the pilot $e''$. The recess $e'$ is adapted to receive the pilot $f''$ of welding strip section $f$, having formed in its opposite end the recess $f'$. In this case the walls surrounding the recesses respectively are slotted, and the pilots are slightly larger than the recesses. The operator presses the pilots into the recesses of the sections respectively, and the spring pressure of the walls surrounding the recesses satisfactorily connects the several sections.

Fig. 4 shows another form of my invention wherein the welding strip sections $g$ and $h$ have pilots $g'$ and $g''$ and $h'$ and $h''$ formed at their ends, and are connected together by means of the short tube or ferrule $i$. In this case the pilots may be tapered and a correspondingly tapered ferrule may be employed, so that the welding strip sections respectively will be frictionally connected to the ferrule; the bore of the ferrule may be straight with straight and, if desired, knurled pilots on the welding strips, in which case the walls of the ferrule may be forced against the pilots manually, as by applying pressure with pliers; or automatically by applying pressure with the feed rolls $k$ and $l$ of the device of Fig. 5; or the ferrule may be slotted at either end, so that the connection between the welding strip sections respectively and the ferrule will be by spring pressure.

Fig. 5 shows a welding head $j$ having feed rolls $k$ and $l$ for feeding the welding strip to the arc. Feed roll $k$ may be power driven, $l$ is an idler feed roll, mounted upon the eccentric shaft $m$, and pressed with considerable force against the welding strip $n$ by the tension of the spring $o$, acting upon the handle $p$, attached to the said eccentric shaft m. The perimeters of the feed rolls k and l are preferably serrated, so that the rolls bite into the welding strip n and thus insure a positive feeding movement. In the upper portion of the welding-head j is the hollow guide r, and in the lower portion of the welding-head is the hollow guide s, for maintaining the welding electrode in the proper position. The guide r also serves as a means for readily positioning successive sections of welding strip, so that the pilot of one section will with certainty enter into or telescope with the recess of the section which is being fed and fused. In metallic arc welding the operator's face is protected from the heat and the intense light of the arc by a shield usually held in his hand, and having in it a colored window for enabling him to observe the arc. In order to protect the eyes of the operator, this colored glass must be so nearly opaque that objects outside the immediate zone of the arc are not clearly visible. With my invention it is only necessary that the operator note, by the sense of touch, that the outer end of the welding strip which is being fed and fused has entered the guide r, and then insert the piloted end of another welding strip section in the guide, which preferably has a widely-flaring opening.

While it has heretofore been proposed, in the art of electrical casting of metals, to connect by male and female screw threads casting rods of considerable diameter, my invention relates to the art of metallic arc welding, wherein are employed welding wires or strips of considerably smaller diameter. Casting rods of 6 to 15 millimeters diameter can be readily recessed and tapped in one end and piloted and threaded on the other end, it being possible to employ a relatively coarse screw thread, thus necessitating but a few turns of one casting rod with reference to the other in order to firmly couple the two together. When, however, it is sought similarly to tap and thread welding wire or strips of from ⅛" to 3/32" in diameter (such as are ordinarily employed in welding steel sheets of considerable thickness), the screw threads must be fine, and, if the recess and coacting pilot are of sufficient length to insure a strong joint, a large number of threads are required. One of the operator's hands is usually occupied in holding the shield, and in some cases the other hand is also occupied in directing the arc to the proper point on the work. As has been heretofore pointed out, the operator is unable to clearly see the outer end of the welding strip; and it is well known in the mechanical art that it is quite difficult, under the most favorable conditions, to initially engage fine male and female threads. Further, the welder wears heavy gloves to protect his hands and wrists, which obviously makes it difficult to securely hold and rotate a welding strip section of small diameter in order to screw it into another section. Thus the operating conditions are very unfavorable for threading together two or more sections of welding wire of relatively small diameter—particularly where, as in automatic welding with high amperage, the welding wire frequently fuses as rapidly as 20 to 25 inches per minute.

My invention overcomes these difficulties by providing means whereby, under the operating conditions which prevail in metallic arc welding, additional sections of welding wire may from time to time be quickly and with certainty connected to the section already being fed to the arc, so that a continuous supply of welding material is made available and the arc is not interrupted, as it would be if short lengths of wire were used and not coupled together.

It has heretofore been proposed, in automatic metallic arc welding, to feed from a reel a welding wire of indefinite length. While this procedure gives satisfactory results in the case of welding wire of small diameters, such as 1/8" or 3/32", wires of much larger diameter are stiff and unyielding, and considerable power is required to uncoil them from the reel and feed them with certainty. If there is slippage between the feed rolls and the wire, as will occur if insufficient pressure or power is applied, the arc will vary in length, thereby producing a deleterious effect upon the quality of the weld. Additionally, the welding wire should be straight as fed to the arc, and the use, in connection with an automatic metallic arc welder, of a wire-straightening device adds to the complications and cumbersomeness of the installation.

In metallic arc welding, the work constitutes one electrode and the welding wire the other electrode. In many cases, such as when welding in cramped quarters, it is not feasible to employ, in automatic metallic arc welding, a long straightened piece of wire, for the reason that such a wire may accidentally contact with the work, producing a short circuit and extinguishing the arc. Moreover, the use of such long pieces of straightened wire always involves the waste of the portion between the work and the end which last passes through the feed rolls. Further, the operator may find that before a particular weld is completed, he has reached the end of such a long piece of wire, and in this case the arc is extinguished, and he must remove the remaining short piece, insert a new length, and strike a new arc— thus wasting considerable time.

For the foregoing and other reasons, it is therefore desirable to provide means whereby relatively short sections, say 14" in length, of welding wire of diameters larger than can easily be uncoiled from a reel, may, under the unfavorable conditions maintaining in metallic arc welding, be readily and with certainty coupled together to prevent interruption of the arc and waste of time and welding material. My invention accomplishes this result.

What I claim as new and desire to secure by Letters Patent of the United States is:

1. In metallic arc welding, two welding strips connected together by an unthreaded joint.

2. A metallic welding electrode having an unthreaded recess at one end and a pilot at the other end.

3. In metallic arc welding, two welding strips frictionally joined together.

4. In electric arc welding, a metallic electrode comprising a plurality of sections frictionally connected at their ends.

5. In electric arc welding, a welding strip of indefinite length comprising a series of strips of shorter length having an unthreaded recess at one end and a pilot at the other end, said pilots respectively being inserted in said recesses.

6. A metallic welding electrode having a tapered pilot adapted to enter a tapered recess of another electrode.

7. A metallic welding electrode having a tapered recess at one end and a tapered pilot at the other end.

8. In metallic arc welding, means for feeding a welding strip to the arc, and a bell-mouth guide closely adjacent to the feeding means for directing a welding strip to said feeding means.

9. In metallic arc welding, two welding strips in jointed relation and constructed and arranged to be operatively connected by pressure.

10. In electrode arc welding, a metallic electrode comprising a plurality of sections connected by pressure at their ends.

11. In metallic arc welding, two aligned welding strips in telescopic relation, constructed and arranged to be operatively connected together by pressure.

12. In metallic arc welding, two electrodes connected together by a joint formed by a recess in the one and a knurled pilot on the other.

13. A metallic welding electrode having a pilot at one end and a recess surrounded by a thin wall at the other end.

14. In metallic arc welding, a welding electrode having a recess surrounded by a collapsible wall adapted to be pressed against another electrode to grip the same.

HARRY D. MORTON.